US012767221B2

(12) United States Patent
Mang et al.

(10) Patent No.: US 12,767,221 B2
(45) Date of Patent: Oct. 20, 2026

(54) STEERING SYSTEM FOR A MOBILE WORK MACHINE

(71) Applicant: Liebherr-Werk Ehingen GmbH, Ehingen (DE)

(72) Inventors: Philipp Mang, Ehingen (DE); Felix Reyher, Lauterach (DE); Thomas Kirsamer, Blaubeuren/Asch (DE)

(73) Assignee: LIEBHERR-WERK EHINGEN GMBH, Ehingen (DE)

( * ) Notice: Subject to any disclaimer, the term of this patent is extended or adjusted under 35 U.S.C. 154(b) by 0 days.

(21) Appl. No.: 18/961,101

(22) Filed: Nov. 26, 2024

(65) Prior Publication Data

US 2025/0178666 A1 Jun. 5, 2025

(30) Foreign Application Priority Data

Nov. 30, 2023 (DE) ..................... 10 2023 133 541.3

(51) Int. Cl.
*B62D 7/14* (2006.01)

(52) U.S. Cl.
CPC .................................... *B62D 7/144* (2013.01)

(58) Field of Classification Search
CPC .......... B62D 5/06; B62D 7/144; B62D 5/062; B62D 5/20; B62D 7/148; B62D 7/16; B66C 23/36; B66C 23/62
See application file for complete search history.

(56) References Cited

U.S. PATENT DOCUMENTS 6,059,056 A * 5/2000 Becker ................. B62D 7/1536 180/410
7,770,906 B2 * 8/2010 Koenigstein ........... B62D 7/144 180/209
7,878,291 B2 * 2/2011 Pohl ....................... B62D 7/148 180/408
8,459,400 B2 * 6/2013 Dillard ................. B62D 13/025 92/13
10,370,027 B2 8/2019 Eckmann et al.
(Continued)

FOREIGN PATENT DOCUMENTS

DE 3720273 A1 1/1989
DE 3911995 A1 10/1990
DE 19714485 A1 10/1998
(Continued)

*Primary Examiner* — Jason D Shanske
*Assistant Examiner* — Caitlin Anne Miller
(74) *Attorney, Agent, or Firm* — McCoy Russell LLP

(57) ABSTRACT

The disclosure relates to a steering system for a mobile work machine, in particular for a mobile crane, which comprises at least one mechanically steerable front axle, at least one passively-steered rear axle, as well as at least one rear axle that is steerable by means of at least one steering cylinder. The front and rear axles are arranged one behind the other along a longitudinal axis of the steering system and comprise wheels, the axes of rotation of which, virtually extended, in the case of cornering, on the side of the curve center, intersect a common steering pole plane positioned perpendicularly on the longitudinal axis. According to the disclosure, at least one passively-steered rear axle is arranged between a front axle and the steering pole plane. The disclosure furthermore relates to a mobile work machine comprising such a steering system.

20 Claims, 4 Drawing Sheets

(56) References Cited

U.S. PATENT DOCUMENTS

| | | | | |
|---|---|---|---|---|
| 2011/0175312 | A1 * | 7/2011 | Koenigstein | B62D 7/144<br>280/124.11 |

FOREIGN PATENT DOCUMENTS

| | | | |
|---|---|---|---|
| DE | 10245618 | A1 | 4/2004 |
| DE | 102014113880 | A1 | 3/2016 |
| DE | 202023104306 | U1 | 10/2023 |

* cited by examiner

STEERING SYSTEM FOR A MOBILE WORK MACHINE

CROSS REFERENCE TO RELATED APPLICATION

The present application claims priority to German Patent Application No. 10 2023 133 541.3 filed on Nov. 30, 2023. The entire contents of the above-listed application are hereby incorporated by reference for all purposes.

TECHNICAL FIELD

The present disclosure relates to a steering system for a mobile work machine, in particular for a mobile crane as described herein.

BACKGROUND

Mobile work machines such as heavy commercial vehicles often have a large number of steered axles (also referred to as vehicle axles), which can differ from one another in terms of their arrangement and their type of steering.

SUMMARY

Mobile cranes are an example for such heavy commercial vehicles. In a typical embodiment, a mobile crane comprises a number of N axles, of which one or more (i.e. a number 1 to X, where X<N) together represent front axles that are mechanically steered by the steering wheel. These can be steered with hydraulic support and can comprise corresponding steering cylinders. In the following, the term "front axle" refers in general to a mechanically steerable axle. If a plurality of axles are mechanically connected, then a plurality of front axles is present. This also applies if the front axles are only theoretically mechanically steerable, but without support are too difficult to move in order to turn the wheels.

In addition, the mobile crane can comprise further electrohydraulically steered axles of the number N−X. In the following, steered axles which are not front axles are referred to generally as "rear axles," and electrohydraulically steered rear axles are referred to as "steered rear axles". The steered rear axles are actively steered depending on a steering program, vehicle speed and steering angle of the front axles, for example via two hydraulic steering cylinders (example: a mobile crane has a total of five axles, comprising two front axles and three steered rear axles).

Such mobile cranes are configured such that their emergency steering radius corresponds to the statutory provisions. In this case, the emergency steering circle is the turning circle radius (also referred to as the body turning circle) which the mobile crane describes in the event of a faulty steering system. The steering behavior is checked according to the provisions of ECE R79. If the emergency steering circle is small, the driving behavior of the mobile crane in tight curves is better, in the case of a faulty steering system. In other words, the mobile crane can, provided that the emergency steering circle or radius is small, travel through tight corners at high speed in the case of a faulty steering system. If the emergency steering circle is large, then the speed has to be significantly reduced in order to keep the vehicle on the curve of the roadway.

A fault in the mechanical front axle steering is excluded in the normative specifications, and therefore in the present case the focus is only on the active rear axle steering. Depending on the number of axles and the ratio of front axles to rear axles, to date two variants of the rear axle steering result with respect to a fault.

1. Variant

In the case of certain crane types, on account of the ratio of front axles to rear axles it is possible, with respect to the steering, to set all the axles of the rear axle steering to "straight running" in the case of a fault (=neutral or non-steered position). This is configured in the prior art such that all the involved axles of the rear axle steering have a centering cylinder and two steering cylinders, which are in particular hydraulic cylinders. The steering cylinders are used for operational steering of the crane (in general right and left, one steering cylinder in each case). The centering cylinders have the function, in the case of a fault, of setting the associated rear axles to "straight ahead" (note: in the present text, for the sake of simplicity reference is frequently made to a steering or position of an axle, wherein in fact the steering or position of the wheels of the axle are meant). The centering cylinders are therefore typically larger than the steering cylinders, such that they can over-press them.

Depending on the travel situation and fault situation, the centering cylinder hitherto fulfils two tasks, by its connection: On the one hand, it brings about centering of the associated rear axle (by applying pressure, which is for example provided by a wheel-driven pump, this performs a centering movement of the rear axle). On the other hand, the centering cylinder can fulfil a further task by activating a hydraulic circuit. The centering cylinder can ensure that the associated rear axle can now only be steered towards the middle (no longer further outwards, in order to travel on tighter curves), which is also referred to as blocking.

2. Variant

In certain crane types, it is not possible to fulfil the statutory specifications by straight running of all actively steered rear axles via centering cylinders. In such cases, it is known to install passively-steered rear axles. These can represent one to max. N−X of the axles. In the prior art, such passively-steered rear axles are installed starting from the last or rearmost axle, and are therefore located behind the rear axles that can be centered by centering cylinders. A mobile crane of this kind is known for example from DE 10 245 618 A1.

It is noted at this point that in the present text the specifications "front" and "rear" relate to the straight running travel direction of the vehicle or the work machine. In this case, the front axles are located in front, and the rear axles behind the front axles. The rear region of the steering system in particular corresponds to the tail of the vehicle.

In the case of passively-steered rear axles, the overrun is determined by what is known as the overrun angle, and is achieved by an oblique position of the steering knuckle in the direction of the vehicle longitudinal axis, relative to a vertical to the roadway. This principle is well known. Thus, in this case, the oblique position is configured such that the theoretical wheel contact point is displaced to in front of the center of the axle (the axle is "pulled"). As a result of the theoretical distance between the actual wheel contact point and the theoretical wheel contact point (also referred to as overrun distance), the external forces that act on the mobile crane by the steering of the mechanically steered front axles and by the centered rear axles, a torque is generated on the passively-steered rear axle (the torque thus results from the steering and not from the overrun).

Hitherto, the passively-steered rear axles have been attached exclusively to the vehicle tail because they are at the greatest distance, here, from the steering pole or from the steering pole plane (the steering pole refers to the virtual point of intersection of the virtual extensions of the axes of rotation of the wheels). The passively-steered rear axles have therefore been located up to now behind the steering pole. In the following, passively-steered rear axles arranged behind the steering pole, viewed in the longitudinal direction of the vehicle or the steering system, are referred to as "trailing axles". Hitherto, it has been assumed that this has the greatest effect on the emergency steering radius.

In contrast to a centered rear axle, a trailing axle provides the advantage that it is freely movable by external forces (cf. shopping trolleys) and therefore, in the event of a fault, turns by the steering movement of the front axles, and thus by the external force that acts on the trailing axle. However, the advantage during forwards travel is at the same time a disadvantage during backwards travel. In the event of backwards travel with an activated (i.e. non-locked or raised) trailing axle, the trailing axle can be moved by the external force in a direction that is disadvantageous for backwards travel, e.g. when "swerving". Optionally, the trailing axle can remain stationary (the resetting of the trailing axle does not always have to function).

If the number of trailing axles is increased (e.g. on account of the need to maintain the specified emergency steering radius), the described effect for backwards travel can also occur in the case of forwards travel. Therefore, care should be taken that the trailing axle can also be brought back into the straight running position following cornering (in the forwards direction). If too many trailing axles are provided, it may be the case that not all the trailing axles can be set fully to straight running again after completion of the cornering.

Against this background, the object of the present disclosure is that of specifying a mobile work machine of the type in question, having a small emergency steering radius, in which the above-described disadvantages are avoided.

According to the disclosure, this object is achieved by a steering system as described herein.

According thereto, a steering system for a mobile work machine, in particular for a mobile crane, is proposed, which comprises at least one mechanically steerable front axle (in the following simply "front axle"), at least one passively-steered rear axle, as well as at least one rear axle that is steerable by means of at least one steering cylinder (in the following simply "steerable rear axle"). If reference is made in the following to the front axle, the steered rear axle or the passively-steered rear axle (singular), in each case the at least one front axle, steered rear axle or passively-steered rear axle is meant.

The front and rear axles are arranged one behind the other along a longitudinal axis of the steering system (which is in particular simultaneously the longitudinal axis of the mobile work machine). The front and rear axles comprise wheels which are rotatably mounted about axes of rotation. The front and rear axles are configured such that in the case of cornering of the mobile work machine the axes of rotation of the wheels that are virtually extended on the side of the center of the curve intersect a common plane which is positioned perpendicularly on said longitudinal axis. Said common plane is referred to in the following as the steering pole plane, since in the case of Ackerman steering the virtual extensions of the axes of rotation intersect in a common steering pole which is located in the steering pole plane.

According to the disclosure, at least one passively-steered rear axle is arranged between a front axle and said steering pole plane. Said passively-steered rear axle is thus located "in front of" the steering pole plane and not, as is conventional in the prior art, "behind" the steering pole plane, and is therefore referred to in the present case as the "pusher axle".

In this case, it should be clarified that the present pusher axle is still a passively-steered rear axle (i.e. the theoretical wheel contact point is located in front of the center of the axle, in the straight running travel direction of the work machine, such that the wheels of the pusher axle are "pulled"). The distinction between the pusher and trailing axle thus refers in the present case only to the position with respect to the steering pole plane. It is also conceivable that the pusher axle is located exactly in the steering pole plane.

The pusher axle improves the steering of the mobile work machine in the event of a fault, since the pusher axle, on account of its position in the front region of the steering system, is located between two wheel axles having fixedly defined steering parameters, e.g. between a front axle and a centered rear axle (in the case of a fault), between two front axles, or between two centered rear axles. As a result, the pusher axle is guided, and therefore the disadvantages that conventional trailing axles may exhibit for example in the case of backwards travel do not occur.

The pusher axle improves, i.e. reduces (in the case of some crane types, even halves), the emergency steering radius of the steering system according to the disclosure or of the mobile work machine equipped therewith. This results in the steering system or the mobile work machine not tending to significant understeering in the case of a fault, and the speed not having to be abruptly significantly reduced by the driver in or before tight corners, in order to safely drive around the corner. As a result, the safety in road traffic in the case of steering failure can be increased.

Moreover, the pusher axle also results in a costs saving, since in the case of vehicles having a plurality of steered rear axles it can replace one of the steered rear axles in the front region, and as a result the centering cylinder is omitted.

The at least one pusher axle according to the disclosure can also comprise one or more (in particular two) steering cylinders, which in the case of a fault are connected to one another or "released" in such a way that the axle is passively-steered (i.e. follows the steering angle of the front axle(s) in a predetermined manner on account of the acting torques). In the simplest case, the at least one pusher axle can have the same design as the at least one steered rear axle, and can differ therefrom for example only in that it does not comprise any centering cylinder but instead has an overrun. In normal operation, the pusher axle can, like the remaining steered rear axles, be actively steerable electrohydraulically via the steering cylinders, and can be "released" only in the event of a fault, such that it functions as a passively-steered rear axle. Alternatively, the pusher axle may not comprise any steering cylinder, and therefore at this point can only passively "travel along".

Optionally, the at least one pusher axle is configured such that it cannot be blocked and/or cannot be lifted off the ground and thereby "deactivated". This results in a simple and cost-saving configuration. However, it is alternatively conceivable that the at least one pusher axle is blocked for particular situations and/or can be actively lifted off the ground.

In the case of steering or cornering, the pusher axle in particular turns in the same direction as the front axle. In contrast, typical trailing axles, which are located in the rear region, i.e. behind the steering pole plane, turn in the opposite direction from the front axle.

The mechanical steering of one or more front axles can be assisted by hydraulic steering cylinders (power steering principle). For this purpose, one or more front axles can each be steerable via one or more (in particular two) hydraulic steering cylinders, in addition to the mechanical steering. In this case, the hydraulic steering by means of the steering cylinder takes place only in a supporting manner.

Optionally, the steering system comprises exclusively actively steerable axles, i.e. 1 times X mechanically steerable front axles and N–X rear axles that are electrohydraulically steerable in normal operation, wherein N represents the number of all the axles. In this case, the at least one pusher axle also has one or more steering cylinders and is released only in the case of a fault, and therefore is passively-steered. The remaining rear axles optionally all comprise a centering cylinder. In this embodiment, the at least one pusher axle in particular differs from the remaining rear axles only in that it does not comprise any centering cylinder, but instead has an overrun and in the event of a fault is released as the passively-steered axle.

In a possible embodiment, it is provided that the steering system comprises a plurality of front axles which are coupled to one another via a mechanical steering device, in particular via a steering linkage. The steering device or the steering linkage can be connected via a steering gear to a control element which actuates the steering device or the steering linkage. In particular, the steering linkage ensures a synchronous steering of all the wheels of the front axles, wherein each wheel is optionally moved according to the steering direction and the position of the front axle or the position with respect to the steering center, with an individual steering (in particular for achieving Ackerman steering).

In a further possible embodiment, it is provided that the at least one steering cylinder is a hydraulic cylinder. The steering cylinder is in particular a dual-acting hydraulic cylinder having two pressure chambers in each case, which bring about a steering angle of the associated wheel in one or the other direction in the case of application of pressure. In this case, the steering system comprises at least one hydraulic circuit for actuating the at least one hydraulic steering cylinder. Different hydraulic circuits can be provided for different axles.

In a further possible embodiment, it is provided that at least one steerable rear axle, optionally all steerable rear axles, comprises a centering cylinder, which is configured such that the associated rear axle, in the case of a fault, is blocked with respect to steering and/or is moved into a non-steered position. The centering cylinder is in particular a hydraulic cylinder, optionally a dual-acting hydraulic cylinder. The at least one centering cylinder is controlled by one (or more) hydraulic circuit(s) of the mobile work machine. In the event of a fault, the blocking and/or centering of the steered rear axle(s) in particular takes place automatically. The centering cylinder can be configured as has been described at the outset with respect to the prior art.

The steering system according to the disclosure can comprise active rear axle steering according to DE 10 245 618 A1, the disclosure of which is explicitly referred to herein. In particular, the at least one steerable rear axle comprising a centering cylinder can be configured according to this disclosure.

In a further possible embodiment, it is provided that the steering system comprises an acquisition system, by means of which a pressure in a hydraulic circuit for steering the at least one steered rear axle and/or a speed of the mobile work machine can be acquired. For this purpose, the acquisition system comprises one or more corresponding sensors. The abovementioned fault situation can be detected by the acquisition system in particular by acquiring a pressure drop in the hydraulic circuit and/or exceeding of a defined speed of the work machine and/or an implausible steer angle or exceeding of a defined steer angle.

The steering system or the mobile work machine comprising the steering system optionally comprises a control unit which is connected to the acquisition system or obtains data of the sensor or sensors of the acquisition system and controls one or more axles of the steering system correspondingly. This can include actuation of the abovementioned centering cylinder of at least one steered rear axle, and/or actuation of one or more steering cylinders.

In a further possible embodiment, it is provided that the at least one steerable rear axle comprises two in particular hydraulic steering cylinders. Each of the steering cylinders can be associated with one of the wheels of the associated rear axle ("right-hand" steering cylinder and "left-hand" steering cylinder).

In a further possible embodiment, it is provided that in addition to the at least one pusher axle, which is arranged in the "front" region of the steering system (i.e. "in front of" the steering pole plane), at least one passively-steered rear axle is installed on the side of the steering pole plane opposite the at least one pusher axle (i.e. "rear" side). Such passively-steered rear axles are referred to herein as "trailing axles". Said at least one trailing axle can be arranged, in a manner known per se, at the very back (i.e. behind the at least one steerable rear axle, proceeding from the at least one front axle), or between steered rear axles.

On account of the position behind the steering pole plane, the at least one trailing axle is configured to follow a steering angle of the at least one front axle in the opposite direction.

The at least one trailing axle can comprise one or two steering cylinders, which in the case of a fault are connected to one another or "released" in such a way that the axle is passively-steered (i.e. follows the steering angle of the front axle(s) in a predetermined manner on account of the acting torques). In the simplest case, the at least one trailing axle can have the same design as the at least one steered rear axle, and can differ therefrom only in that it does not comprise any centering cylinder but instead has an overrun. Alternatively, the trailing axle may not comprise any steering cylinder and be passively-steered at any time.

The at least one pusher axle and the at least one trailing axle can have the same configuration and differ only in their position with respect to the steering pole plane (and in particular with respect to their following of the at least one front axle in the same direction or in the opposite direction).

In a further possible embodiment, it is provided that the pusher axle is configured to follow a steering angle of the at least one front axle in the same direction.

Alternatively or in addition, the at least one pusher axle is arranged between a front axle and a steerable rear axle, or between two front axles, or between two steerable rear axles. As a result, it is also guided well in the case of backwards travel, and cannot, as may be the case in conventional trailing axles, become stuck.

In a further possible embodiment, it is provided that the at least one front axle, the at least one steerable rear axle, and in particular the at least one pusher axle, each comprise at least one steering trapeze, which in turn comprises a steering link and two steering arms. Such steering trapezes are known per se and can form an Ackerman steering system according to the Ackerman principle, in which the virtual extensions of the axes of rotation of the wheels of the front and rear axles meet in a common steering pole.

In a further possible embodiment, it is provided that at least one steerable rear axle and/or at least one passively-steered rear axle is arranged on the side of the steering pole plane opposite the at least one pusher axle and comprises such a steering trapeze, wherein the steering trapezes of the at least one steered and/or passively-steered rear axle are arranged on the rear side of the steering pole plane, and the steering trapezes of the at least one front axle and the at least one pusher axle are arranged on the front side of the steering pole plane, reflected with respect to one another (in plan view of the steering system). This ensures that the wheel on the inside of the curve, in each case, is subject to the greatest steering angle. In the event of steering, the axles on the front side of the steering pole plane have wheel steering angles in the same direction, with the front axle or axles, while the axles on the rear side of the steering pole plane have wheel steering angles in the opposite direction thereto.

In a further possible embodiment, it is provided that the virtual extensions of the axes of rotation of the wheels of the front and rear axles in the case of cornering meet at a common point (steering pole), wherein the steering pole is in particular located in the steering pole plane. The axles of the steering system thus in particular form an Ackerman steering system.

The present disclosure furthermore relates to a mobile work machine, in particular a mobile crane, comprising a steering system according to the disclosure. It is evident that the same properties and advantages result here as for the steering system according to the disclosure, and therefore a repeated description is dispensed with. In particular, the mobile work machine can comprise a steering system according to any of the above-described variants or any combination thereof.

The work machine can comprise a mobile undercarriage that comprises the steering system, and an upper structure that is rotatably mounted on the undercarriage.

In a possible embodiment, it is provided that the work machine comprises at least two, optionally at least three, particularly optionally at least four rear axles that are steerable via steering cylinders. The work machine can for example comprise exactly two, exactly three, exactly four, exactly five, exactly six, etc. rear axles that are steerable via steering cylinders.

In a further possible embodiment, it is provided that the at least one steerable rear axle comprises at least one, optionally two, hydraulic steering cylinders which are actuatable via a hydraulic circuit of the mobile work machine.

In a further possible embodiment, it is provided that the work machine comprises a control unit (which can for example be a crane controller), by means of which the at least one steering cylinder of the at least one steerable rear axle can be controlled. The mobile work machine optionally further comprises an above-described acquisition device, which is connected to the control unit.

BRIEF DESCRIPTION OF THE FIGURES

Further features, details and advantages of the disclosure emerge from the embodiments explained below with reference to the figures, in which.

DETAILED DESCRIPTION

Figure 1:
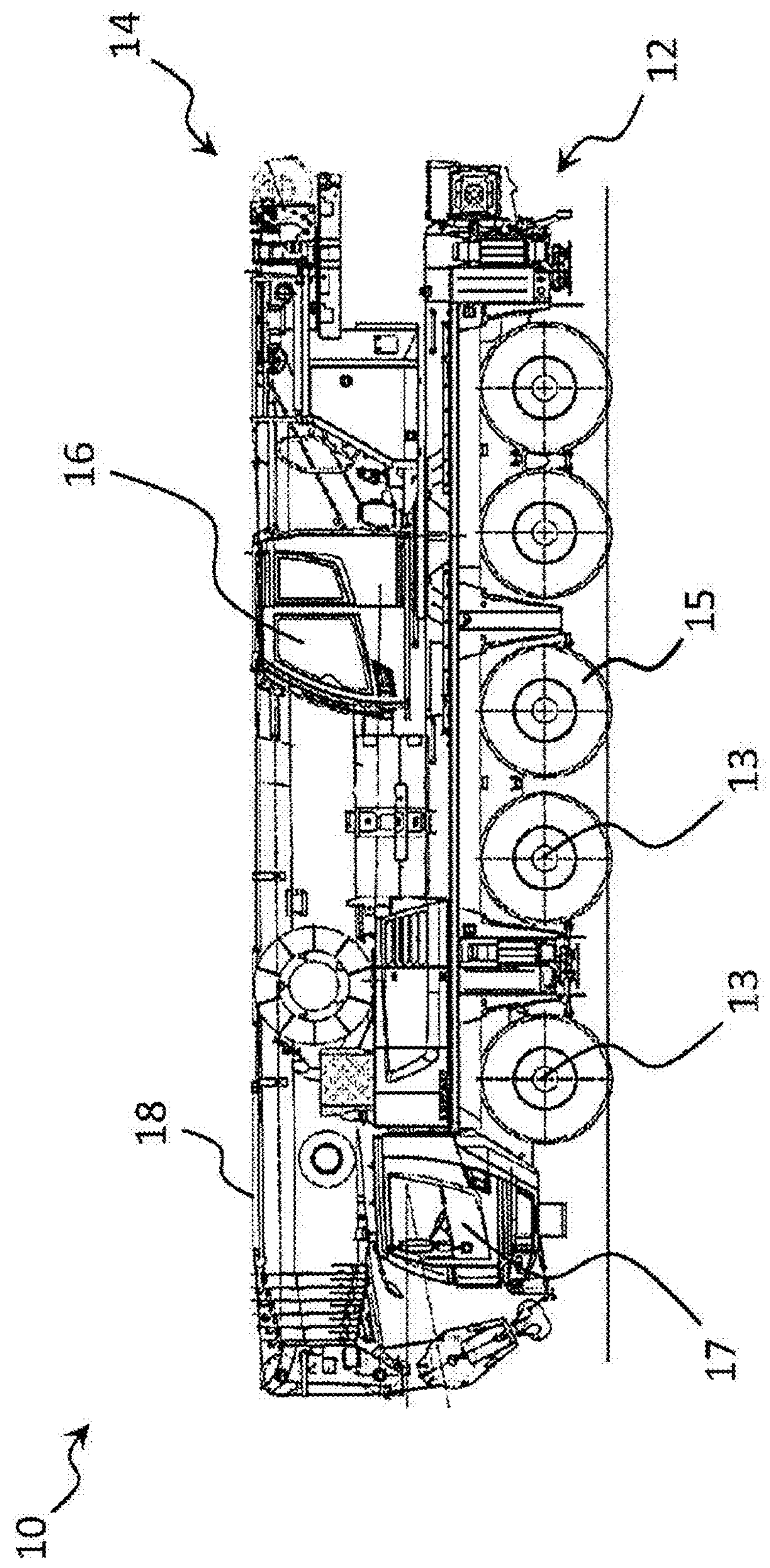
FIG. 1: is a side view of the mobile work machine according to the disclosure, according to an embodiment.

FIG. 1 is a side view of an embodiment of the mobile work machine 10 according to the disclosure, in the form of a mobile crane. Although the following description of the embodiments is made with reference to said mobile crane 10, the steering system according to the disclosure is not limited to such but rather can be used in any mobile work machines.

The mobile crane 10 according to the embodiment shown comprises a mobile undercarriage 12 comprising a steering system according to the disclosure. The latter comprises a wheel chassis having five axles 13, which each comprise pairs of wheels 15. Here, for example single or double wheels are conceivable on each side, depending on the crane configuration. The undercarriage 12 has an undercarriage cab 17 on the front side, for steering the mobile crane 10 during road travel. Furthermore, the undercarriage 12 comprises a support device having a plurality of support cross-pieces which carry support cylinders for lifting the mobile crane 10 from the substrate. In the mobile crane 10 of the embodiment shown, an upper structure 14 is mounted on the undercarriage 12 so as to be rotatable about a vertical axis of rotation, and comprises an upper structure cab 16 for control during crane operation, and a telescopic boom 18 that is mounted so as to be pivotable about a horizontal axis.

Figure 2:
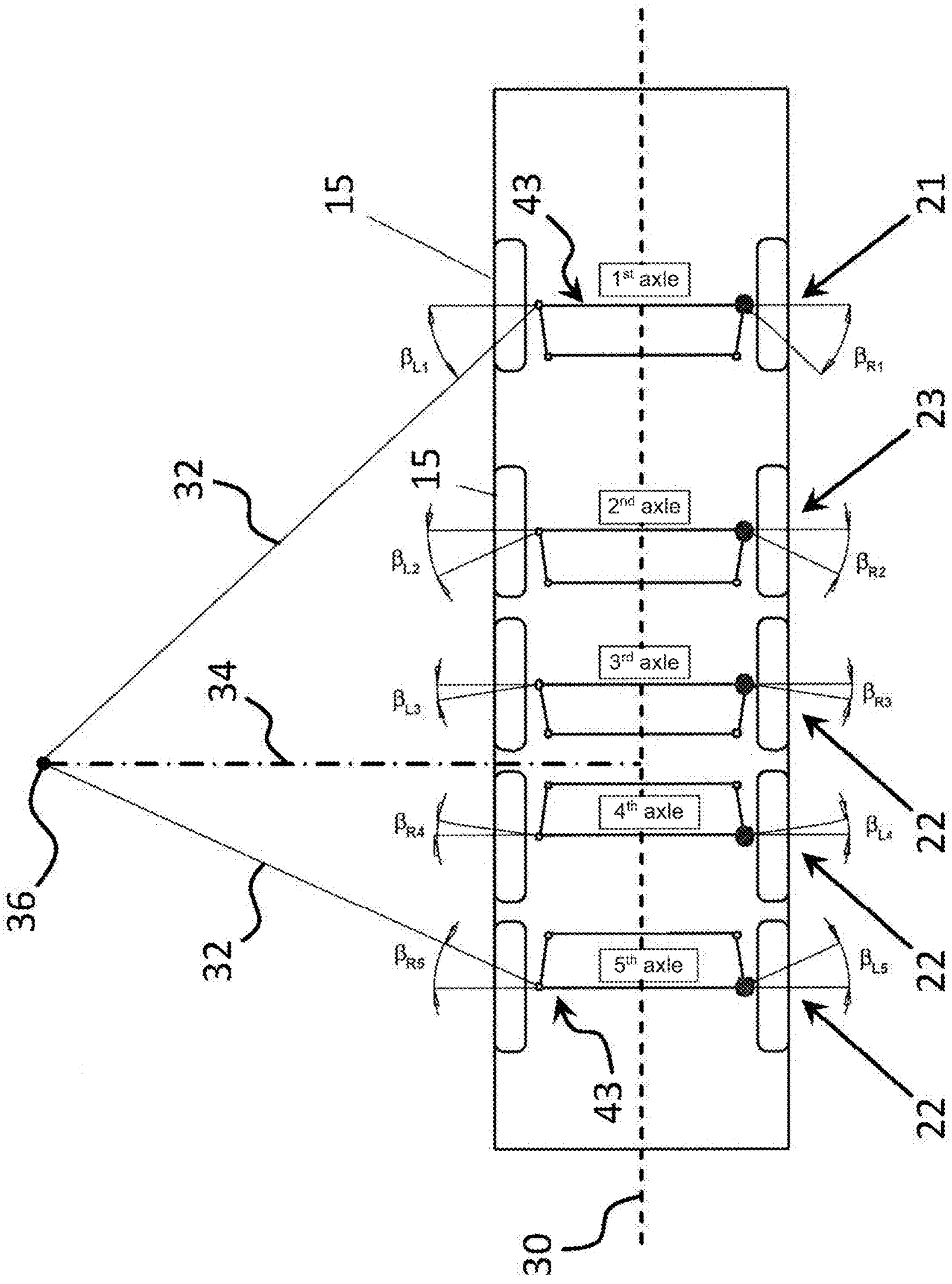
FIG. 2: is a schematic plan view of the steering system according to the disclosure, according to an embodiment.

FIG. 2 is a schematic plan view of the steering system of the mobile crane 10 of the embodiment according to FIG. 1. In this case, the dashed line 30 denotes the longitudinal axis of the steering system, which also simultaneously represents the longitudinal axis of the undercarriage 12. In FIG. 2, the front side of the undercarriage 12 is on the right and the undercarriage tail is on the left. The five axles 13 are arranged one behind the other and in parallel with one another along the longitudinal axis 30. Correspondingly, the right-hand axle in FIG. 2 is referred to as the first axle and the numbering increases to the left or to the rear in the direction of the vehicle tail (i.e. the rearmost wheel axle is the fifth axle).

In the embodiment shown here, the steering system comprises a mechanically steerable front axle 21 (the first axle in FIG. 2), which is steerable in particular by a steering wheel in the undercarriage cab 17 and which can comprise additional hydraulic steering cylinders for assisting the steering force. The remaining four axles 13 follow the wheel steering angle of the front axle 21 in a predetermined manner, such that the virtual extensions 32 of the axes of rotation of the wheels 15 (of which only those of the first and fifth axle are shown) meet at a common point 36, the steering pole 36, on the side of the curve center (cf. FIG. 2). The dot-dashed line 34 shown in FIG. 2 indicates a plane that is positioned perpendicularly on the longitudinal axis 30 and extends through the steering pole 36, which plane is referred to as the steering pole plane 34.

Figure 3:
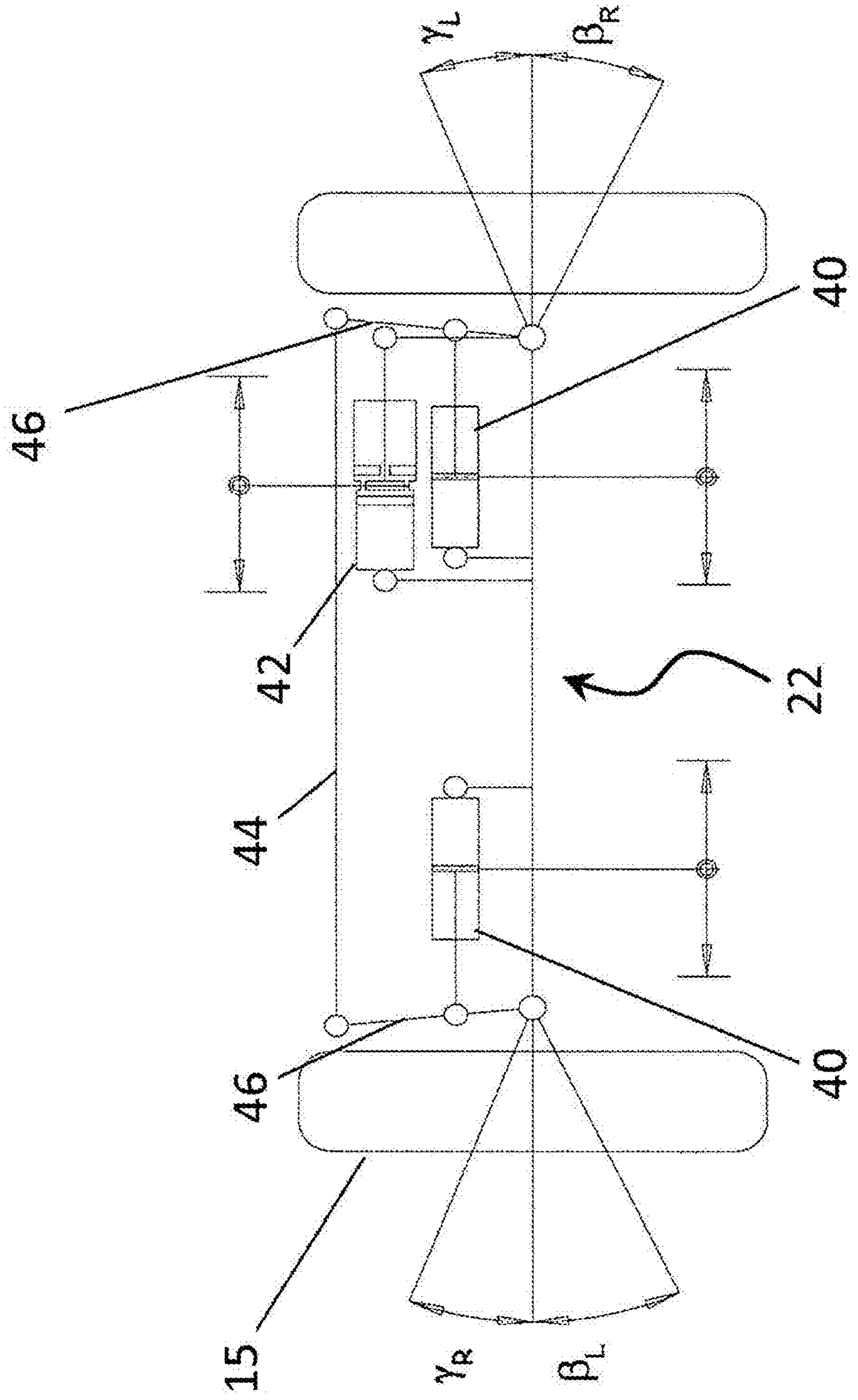
FIG. 3: is a schematic plan view of the steered rear axle of the steering system according to the disclosure, according to an embodiment.

This is made possible mechanically in that each axle 13 in this embodiment has a steering trapeze 43, which is shown in more detail in FIG. 3. The steering trapezes 43 each comprise a steering link 44 which extends in parallel to the axle in a straight running position and which is pivotably connected to two steering arms 46 which are arranged in the region of the wheels 15 or the wheel suspensions carrying the wheels 15. The steering arms 46 are in turn pivotably connected to the axle, wherein the wheels 15 are deflected, by pivoting the steering arm 46 relative to the axle, by an angle $\beta_L$ on the left-hand side and by an angle $\beta_R$ on the right-hand side. These angles are also referred to as toe angles.

FIG. 2 shows the individual toe angles of the wheels 15 of the respective axles on the left-hand side ($\beta_{L1}$-$\beta_{L5}$) and on the right-hand side ($\beta_{R1}$-$\beta_{R5}$) (warning: for the sake of simplicity, in the schematic FIG. 2 despite the indicated deflection the wheels are shown in the non-steered state, i.e. in the straight running position). It can be seen that the individual toe angles differ in magnitude from axle to axle, and also for each axle, between the right-hand and left-hand wheel 15. Furthermore, the wheels 15 on the right-hand side or in front of the steering pole plane 34 are deflected in the same direction (but by different toe angles) to the left, while the wheels 15 on the left-hand side or behind the steering pole plane 34 are deflected in the opposite direction from the wheels 15 in the region in front of the steering pole plane 34 (and again by different toe angles). Such steering is referred to as Ackerman steering. This can be able to be set for example by selecting a corresponding steering program of the mobile crane 10. In addition, further steering programs can be selectable (e.g. crab steering, in which the wheels of all the actively steered axles 13 are deflected in the same direction and by in particular virtually identical toe angles).

The steering system comprises actively steerable rear axles 22, which automatically follow the steering angle of the front axle 21 (and specifically such that the Ackerman condition according to FIG. 2 is fulfilled). For this purpose, the steered rear axles 22 optionally each comprise two hydraulic steering cylinders 40, which are in each case arranged on the right-had side and left-hand side on the axles, and in particular connect the steering arms 46 to the axle. An embodiment for a steered rear axle 22 of this kind is shown as a schematic plan view in FIG. 3. Retracting or extending the steering cylinders 40 pivots the steering arms 46 with respect to the axle, and as a result turns or steers the wheels 15 about particular toe angles. In the embodiment shown, in each case two hydraulic steering cylinders 40 are provided, which are supplied or actuated by at least one hydraulic circuit of the work machine 10.

Depending on the steering program, vehicle speed, and steering angle of the front axle 21, the steering cylinders 40 of the steered rear axles 22 are actuated by a corresponding control unit of the work machine 10.

The mobile crane 10 can comprise a control unit which is configured, in the event of a faulty or incorrect rear axle steering, to limit an allowable speed range of the mobile crane 10 to a certain maximum speed (e.g. 40 km/h). If the vehicle speed is above 40 km/h when the fault occurs, it can be provided that active braking does not take place, but rather that the speed is maintained and reduced as required. In one embodiment, information or a warning can be output optically and/or acoustically to the driver.

In the embodiment shown here, the steered rear axles 22 each comprise a hydraulic centering cylinder 42 (cf. FIG. 3), which in the event of a fault (i.e. in the case of faulty rear axle steering) moves the associated rear axle 22 into the neutral position or the straight running position. For this purpose, the centering cylinder 42 is configured such that it can over-press the steering cylinders 40.

If, in the embodiment of FIG. 2, all four axles which are not mechanically steered front axles 21 (i.e. axles no. 2-5) were actively steerable rear axles comprising centering cylinders 42, then in the event of a fault, if all four rear axles 22 are "straight running", the vehicle 10 would push out significantly beyond the front axle 21 in the case of a steering movement by the front axle 21 (the vehicle would oversteer), which would make the steering significantly more difficult. Furthermore, significant tire wear at the front axle 21 would occur.

In order to improve the steering in the event of a fault, and to achieve a smaller emergency steering radius, according to the disclosure a passively-steered rear axle 23 (=pusher axle) is installed in the region in front of the steering pole 36 or in front of the steering pole plane 34, i.e. in the embodiment of FIG. 2 between the steering pole plane 34 and the front axle 21.

In contrast to passively-steered rear axles, which, in known steering systems, are located in the tail region and thus significantly behind the steering pole 36 or the steering pole plane 34, and during cornering always steering in the opposite direction from the front axle 21, depending on the steering program, vehicle speed, and steering angle of the front axle(s) 21, according to the disclosure the pusher axle 23 is located in front of the steering pole 36 and must therefore turn in the same direction as the front axle 21, depending on the steering program, vehicle speed and steering angle of the front axle 21.

For a correct thrust angle at the pusher axle 23 and faultless rolling of the wheels 15 during cornering, the pusher axle 23 in particular comprises a steering trapeze 43 which is arranged rotated or mirrored, in plan view of the steering pole plane 34, with respect to the steered rear axles 22 arranged in the region behind the steering pole plane 34( ) and with respect to the conventional trailing axles) (cf. FIG. 2).

Figure 4:
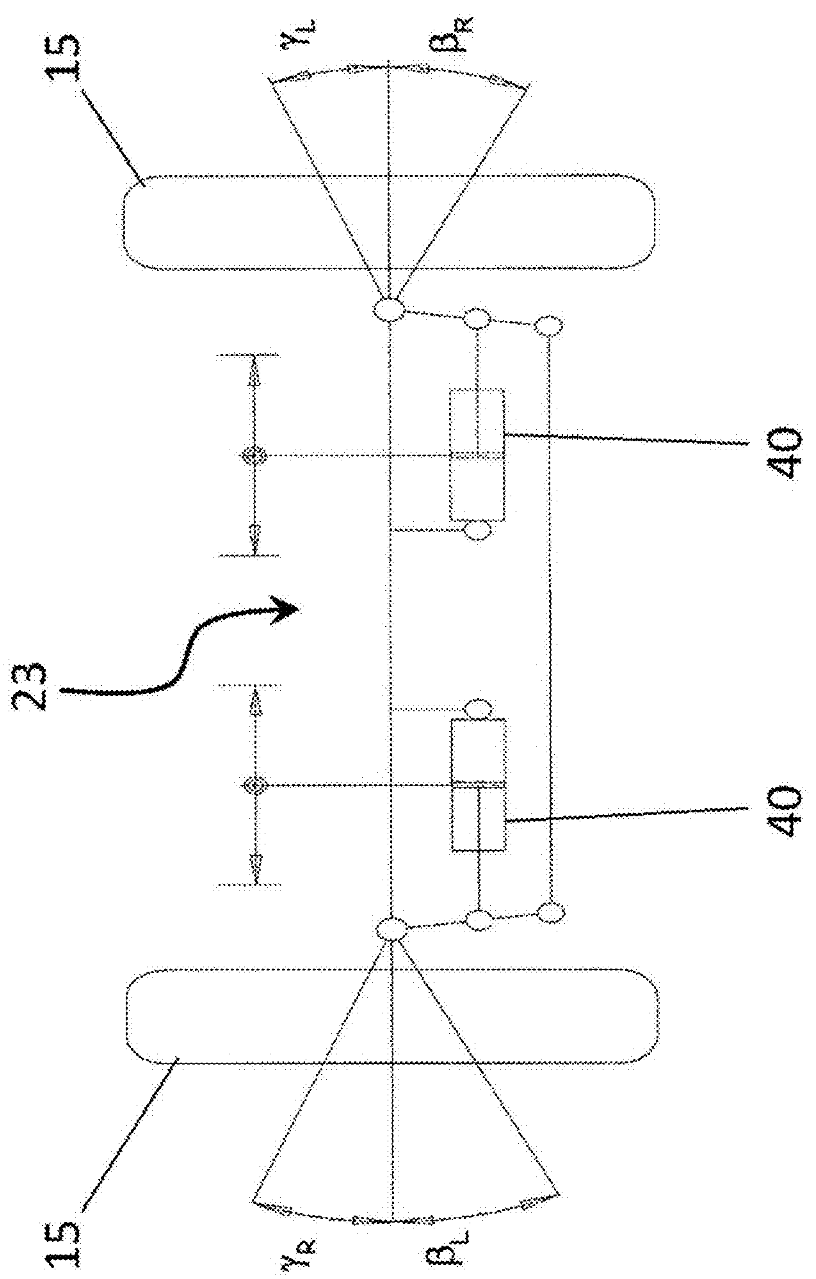
FIG. 4: is a schematic plan view of a pusher axle of the steering system according to the disclosure, according to an embodiment.

FIG. 4 is a schematic plan view of an embodiment of the pusher axle 23 according to the disclosure. This can, just like the steered rear axles 22, comprise two steering cylinders 40, via which it is electrohydraulically steered in normal operation (and therefore behaves like the remaining steered rear axles 22). In the event of a fault, the steering cylinders 40 are in particular switched such that the steering cylinders 40 are hydraulically short-circuited and the pusher axle 23, released as a result, can be moved by external forces and functions as a passively-steered axle. The pusher axle 23 in particular does not comprise a centering cylinder 42.

In the embodiment of FIG. 2, the pusher axle 23 is arranged between a front axle 21 and a steered rear axle 22 (also arranged in the region in front of the steering pole plane 34) which can also be centered in the event of a fault. As a result, the pusher axle 23 is guided by the two surrounding axles 21, 22. Alternatively, the pusher axle 23 could also be arranged between two steered rear axles 22 or between two front axles 21.

The pusher axle 23 installed according to the disclosure in the front region of the steering system reduces the emergency steering radius of the steering system or of the mobile crane 10 (in the case of some crane types, even halves it). This results in the mobile crane 10 not tending to significant understeering in the case of a fault, and the speed not having to be abruptly significantly reduced by the crane driver in or before tight corners, in order to safely drive around the corner. As a result, the safety in road traffic in the case of steering failure can be increased.

Alternatively, a plurality of pusher axles 23 can be provided.

Alternatively, the steering system can comprise one or more trailing axles (i.e. passively-steered rear axles in the region behind the steering pole plane 34). These in particular do not comprise a centering cylinder 42.

Alternatively, the steering system can comprise a plurality of front axles 21 that are coupled together mechanically.

LIST OF REFERENCE NUMERALS

10 mobile work machine (mobile crane)
12 undercarriage
13 axle
14 upper structure
15 wheel
16 upper structure cab
17 undercarriage cab
18 telescopic boom
21 front axle
22 steered rear axle
23 pusher axle
30 longitudinal axis
32 virtual extensions of the wheel axes of rotation
34 steering pole plane
36 steering pole
40 steering cylinder
42 centering cylinder
43 steering trapeze
44 steering link
46 steering arm

The invention claimed is:

1. Steering system for a mobile work machine, comprising at least one mechanically steerable front axle, at least one passively-steered rear axle, and at least one rear axle which is steerable by means of at least one steering cylinder, wherein the at least one mechanically steerable front axle and the at least one passively-steered rear axle are arranged one behind the other along a longitudinal axis of the steering system, and wherein the at least one mechanically steerable front axle and the at least one passively-steered rear axle comprise wheels, the axes of rotation of which, virtually extended, in the case of cornering, on the side of the curve center, intersect a common steering pole plane positioned perpendicularly on the longitudinal axis, wherein at least one of the at least one passively-steered rear axles is arranged between a front axle and the steering pole plane as a pusher axle, and a passively-steered rear axle of the at least one passively-steered rear axles is both positioned between two actively steered axles, and in front of the steering pole plane.

2. Steering system according to claim 1, comprising a plurality of front axles which are coupled to one another via a mechanical steering device.

3. Steering system according to claim 2, wherein the mechanical steering device includes a steering linkage.

4. Steering system according to claim 1, wherein the at least one steering cylinder is a hydraulic cylinder and the steering system comprises a hydraulic circuit for actuating the at least one hydraulic steering cylinder.

5. Steering system according to claim 1, wherein the at least one steerable rear axle comprises a hydraulic centering cylinder, which is configured such that the associated rear axle, in the case of a fault, is blocked with respect to steering and/or is moved into a non-steered position.

6. Steering system according to claim 5, further comprising an acquisition system by means of which a pressure in a hydraulic circuit can be acquired for steering the at least one rear axle, and/or a speed of the mobile work machine and/or a steer angle can be acquired.

7. Steering system according to claim 5, wherein all steerable rear axles comprise hydraulic centering cylinders.

8. Steering system according to claim 1, wherein the two actively steered axles each comprise a centering cylinder, and wherein each of the at least one passively-steered rear axles do not comprise any centering cylinder.

9. Steering system according to claim 1, wherein at least one of the passively-steered rear axles is arranged on the side of the steering pole plane opposite the at least one pusher axle as a trailing axle, and is configured to follow a steering angle of the at least one front axle in the opposite direction.

10. Steering system according to claim 9, wherein the at least one trailing axle is arranged behind the at least one steerable rear axle, proceeding from the at least one mechanically steerable front axle.

11. Steering system according to claim 1, wherein the at least one pusher axle is configured to follow a steering angle of the at least one mechanically steerable front axle in the same direction, and/or wherein the at least one pusher axle is arranged between the front axle and the steerable rear axle, or wherein the front axle is a first front axle and the steering system further includes a second front axle such that there are two front axles and the at least one pusher axle is arranged between the two front axles, or wherein the at least one steerable rear axle includes two steerable rear axles and the at least one pusher axle is arranged between the two steerable rear axles.

12. Steering system according to claim 1, wherein the front axle, and the at least one steerable rear axle each comprise a steering trapeze comprising a steering link and two steering arms.

13. Steering system according to claim 1, wherein at least one steerable rear axle and/or at least one passively-steered rear axle is arranged on the side of the steering pole plane opposite the at least one pusher axle and comprises a steering trapeze which is mirrored with respect to a steering trapeze of the at least one pusher axle, in relation to the steering pole plane.

14. Steering system according to claim 1, wherein the virtual extensions of the axes of rotation of the wheels of the front and rear axles in the case of cornering meet at a common point as a steering pole.

15. Steering system according to claim 14, wherein the steering pole plane contains the steering pole.

16. Mobile work machine, comprising a steering system according to claim 1, wherein the work machine comprises a mobile undercarriage that comprises the steering system, and an upper structure that is rotatably mounted on the undercarriage.

17. Mobile work machine according to claim 16, wherein the at least one rear axle which is steerable by means of at least one steering cylinder comprises at least two rear axles that are steerable via steering cylinders.

18. Mobile work machine according to claim 16, wherein the at least one steerable rear axle comprises at least one hydraulic steering cylinder which can be actuated via a hydraulic circuit of the mobile work machine.

19. Mobile work machine according to claim 16, comprising a control unit, by means of which the at least one steering cylinder of the at least one steerable rear axle can be controlled, wherein the mobile work machine further comprises an acquisition device by means of which a pressure in a hydraulic circuit can be acquired for steering the at least one rear axle, and/or a speed of the mobile work machine and/or a steer angle can be acquired, which is connected to the control unit.

20. Steering system according to claim 1 wherein the work machine is a mobile crane.

* * * * *